Patented Feb. 16, 1937

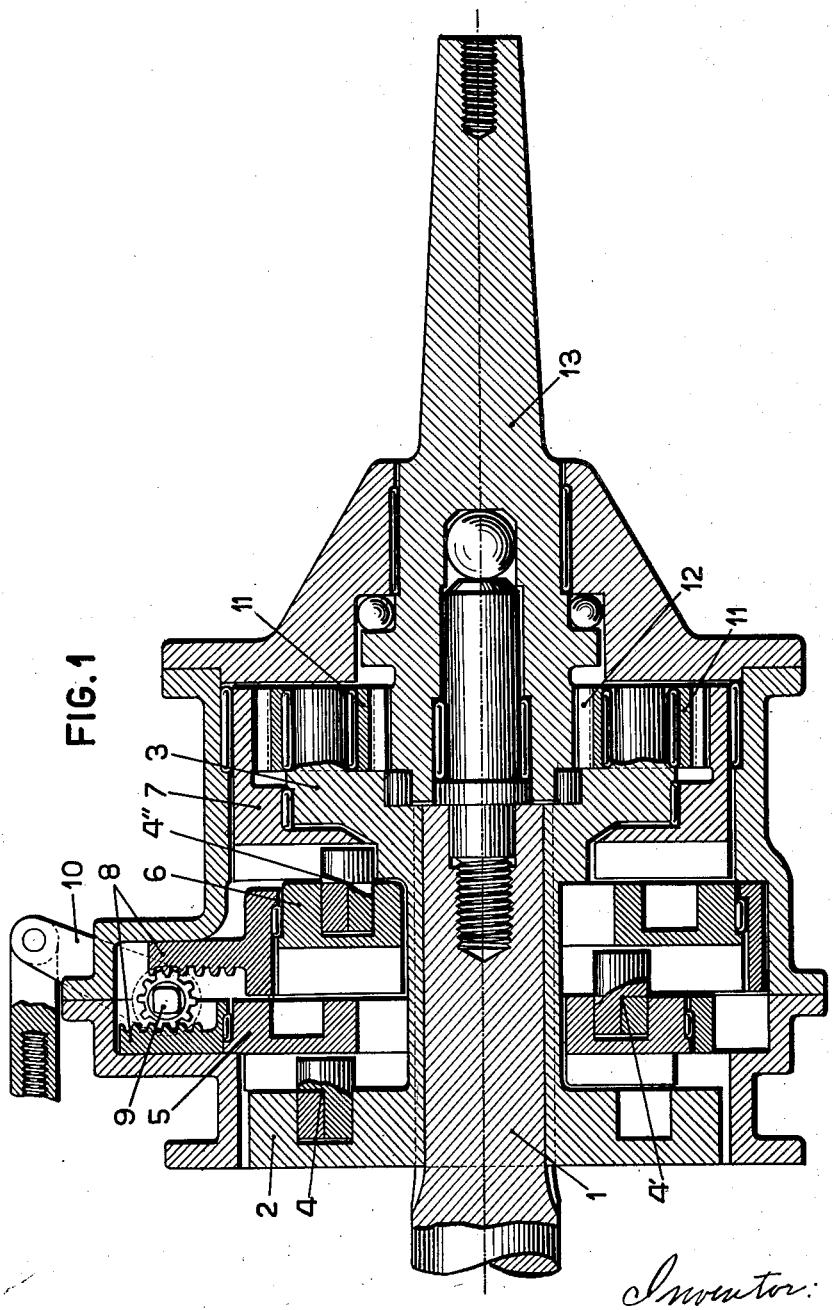

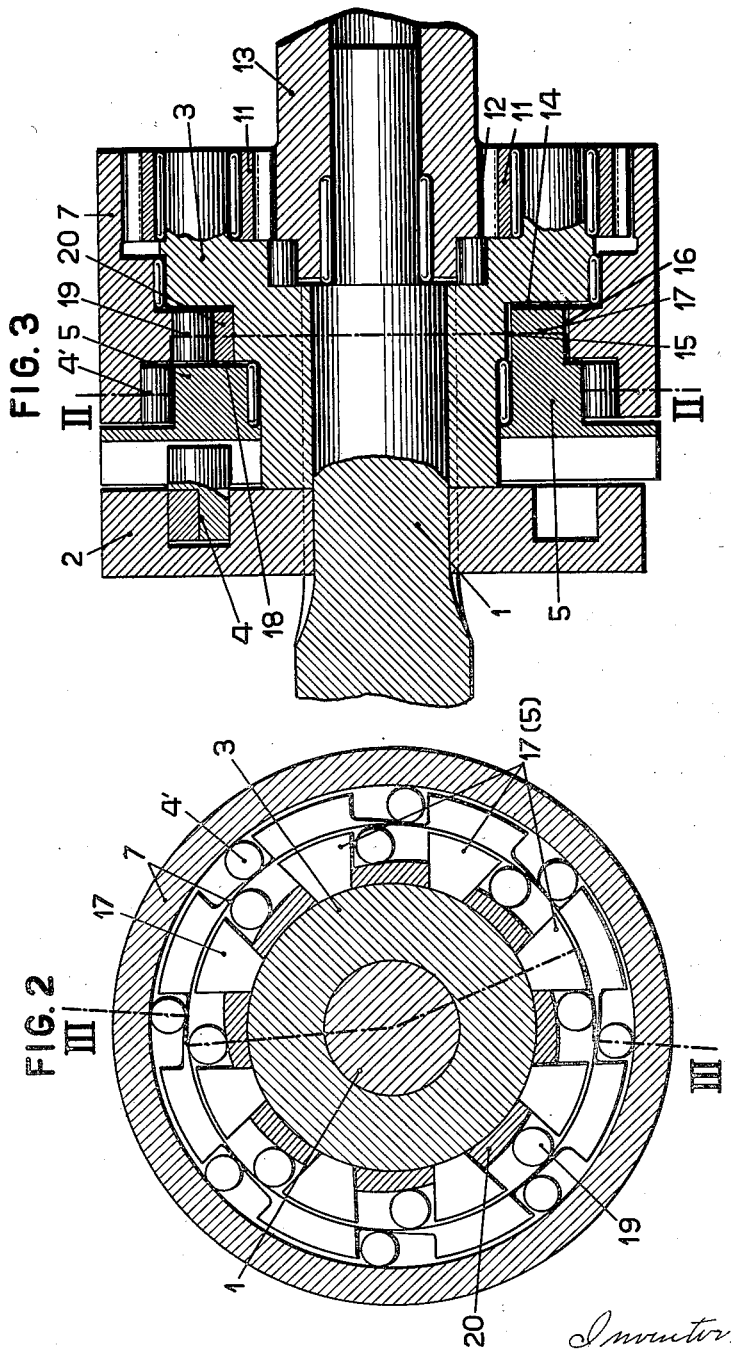

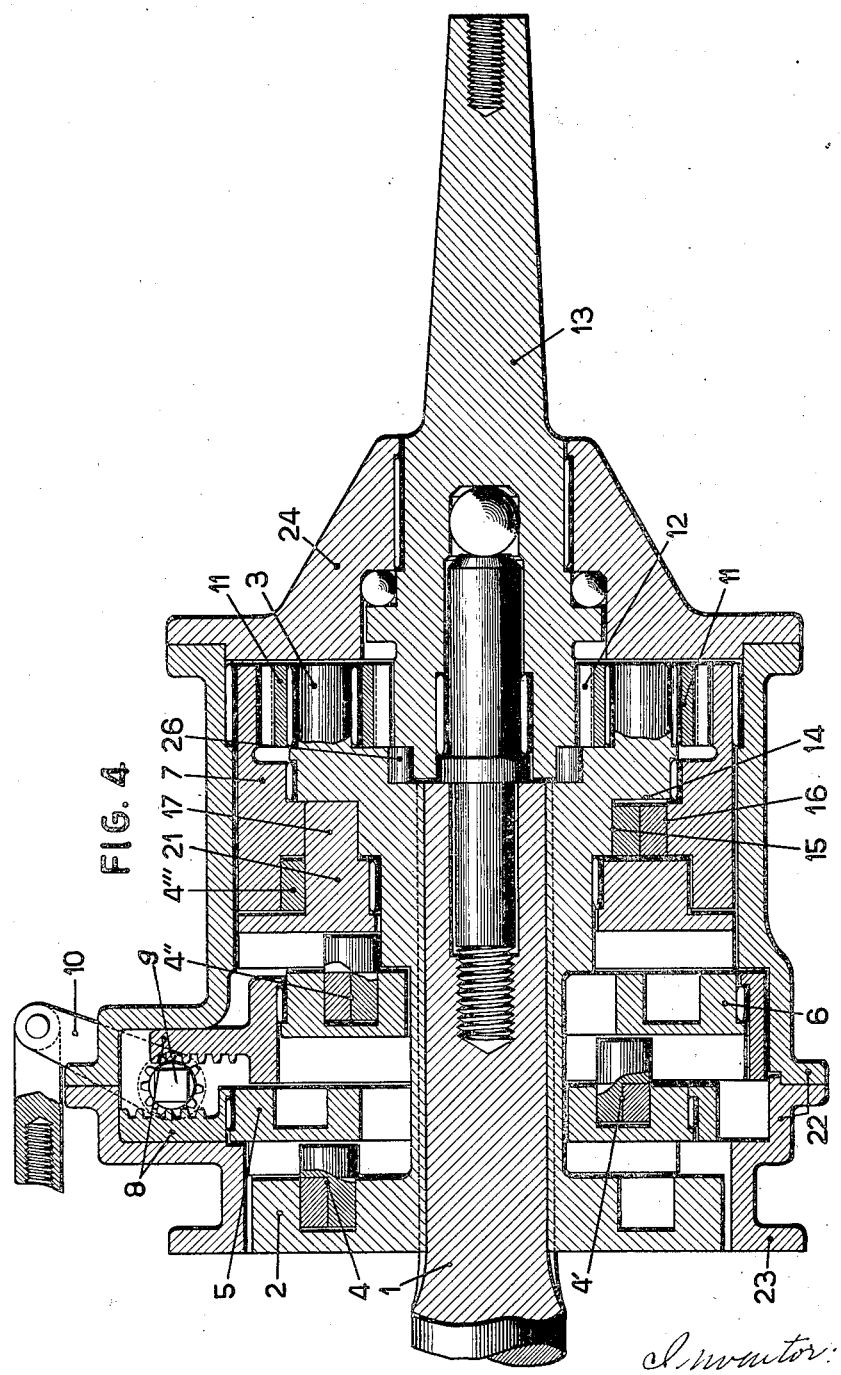

2,070,752

UNITED STATES PATENT OFFICE 2,070,752

FREEWHEEL DEVICE FOR ELIMINATING THE REACTION EFFECTS OF A DIFFERENTIAL GEAR

Georges Roès, Paris, France

Application May 26, 1936, Serial No. 81,923
In France July 31, 1935

2 Claims. (Cl. 74—283)

Devices such as change speed gears are already known, which are characterized by an elementary gearing up mechanism composed of two parallel circular plates rigidly secured, one on the driving shaft, the other on the driven shaft, which shafts are themselves parallel to each other, the opposite faces of these plates being devised for coming in engagement with suitable driving members connecting the driving plate to the driven plate, in such a manner that the rotation of the first one determines that of the second one and that the angular speed of the driven plate relatively to that of the driving plate depends on the distance separating the axes of the driving and driven shafts.

The combination of one or more elementary gearing up mechanism with a system of differential gear elements allows of obtaining gearing down as well as gearing up and even reverse running of a change speed gear, and this with continuous variation of the gearing up or gearing down ratio.

In change speed gears of this type, a difficulty is sometimes encountered resulting from the fact that one of the elements of the differential gear, element which cooperates with the planet wheels meshing with the pinion of the driven shaft, is subjected (particularly when it is driven by means of a free wheel device of the type described in the U. S. A. application Serial Number 73,567, filed on April 9, 1936, in the name of Edouard Gourmain, for "Change speed gear having a progressive action") to the reaction effect of the driven shaft and that it starts to loosely rotate, this preventing the normal operation of the entire mechanism.

The present invention consists in a free wheel device eliminating the reaction effects mentioned above.

The accompanying drawings diagrammatically illustrate, by way of example, on the one hand, a change speed gear made according to the invention described in the American application filed on April 9, 1936, above mentioned and, on the other hand, a similar device improved according to the present invention.

Fig. 1 is a diagrammatic section of a form of construction of a change speed gear which is not provided with the improvement forming the subject-matter of the present invention;

Fig. 2 is a diagrammatic section made according to line II—II of Fig. 3, showing a simplified device provided with the new improvement;

Fig. 3 is a diagrammatic section made according to line III—III of Fig. 2;

Fig. 4 is a diagrammatic longitudinal section of a progressive change speed gear with reverse gear and improved according to the present invention.

In Fig. 1, the change speed gear comprises a driving shaft 1 rotatively rigid with a driving plate 2 and with a plate 3 carrying the planet wheels. The driving plate 2 actuates, by means of free wheel devices 4 (of the type described in the U. S. patent applied for on April 9, 1936, above mentioned), an intermediate plate 5 which, by means of members 4', similar to the members 4, actuates a second intermediate plate 6 driving in its turn, by means of members 4'' (similar to members 4 and 4'), a crown wheel 7.

The intermediate plates 5 and 6, which are so arranged that they can (according to the U. S. application above mentioned) be moved relatively to each other by means of racks 8 in engagement with a pinion 9 controlled from the exterior by an operating lever 10, allow to progressively increase the speed of rotation of the crown wheel 7 relatively to shaft 1 and, consequently, relatively to the plate 3 carrying the planet wheels and rigid with said shaft.

Plate 3 carries a number of planet wheels 11 meshing, on the one hand, with the crown wheel 7 and, on the other hand, with teeth 12 formed at the end of the driven shaft 13.

Examination of the drawings shows that, if the intermediate plates 5 and 6 are, for instance, in such a position that the crown wheel 7 has the same angular speed as the plate 3 carrying the planet wheels, these planet wheels 11 will be stationary and shaft 13 will rotate at the same angular speed as driving shaft 1. Now, for this position of the above mentioned plates as well as for their intermediate positions, up to that corresponding to zero speed of the driven shaft 13, it will be found that said driven shaft 13 can be held stationary, the crown wheel 7 then simply starting to loosely rotate at an angular speed greater than that of the intermediate plate 6 which drives it; in other words, the device does not operate.

The problem to be solved therefore consists in preventing crown wheel 7 from rotating at an angular speed greater than that of the member which drives it, that is to say, than that of intermediate plate 6.

The present invention allows this problem to be solved as follows:

In Figs. 2 and 3, which diagrammatically illustrate a simplified form of construction of a change speed gear improved according to the present invention, 1 designates the driving shaft, 13 the driven shaft, 2 the driving plate, 3 the plate carrying the planet wheels (both these plates being rigid with shaft 1), 4 one of the devices driving a single intermediate plate 5; 7 designates the crown wheel, 11 the planet wheels, 12 the pinion formed at the end of the driven shaft 13, and 4' one of the devices actuating the crown wheel 7 by means of the intermediate plate 5.

In this example, for preventing the crown wheel 7 from rotating more rapidly than the intermediate plate 5, under the reaction effect mentioned in the preceding example, a free wheel device is provided between the elements 3, 5, and 7, by means of which the crown wheel 7 cannot, at any moment, rotate more rapidly than intermediate plate 5. In this free wheel device (more particularly visible in Fig. 2), the face 14 of plate 3 carrying the planet wheels constitutes, with the cylindrical surface 15 of plate 5 and with the cylindrical surface 16 of crown wheel 7, an annular groove in which freely enter a number of projections 17 formed on the face of intermediate plate 5, which face is turned towards the right in Fig. 3.

In each of the housings thus delimited by the various projections 17 are arranged a ball or a roller 19 and a movable incline 20 capable of having a slight play in the housing.

Examination of the drawings immediately shows that, as soon as crown wheel 7 tends to rotate more rapidly (in a clockwise direction) than the intermediate plate, each ball (or roller) 19 exerts a thrust on its movable incline 20 which then rubs against the surface 15 of member 3 for determining a braking action on crown wheel 7 relatively to member 3 (which always rotates at a speed smaller than that of intermediate plate 5). This braking action restores the maximum speed of crown wheel 7 to approximately that of intermediate plate 5.

The application of this free wheel device preventing the differential reactions of a change speed gear of the type above set forth is illustrated in Fig. 4, in which the parts previously described have been designated by the same reference numbers. Thus, in this figure are again to be found the driving shaft 1, driving plate 2, plate 3 carrying the planet wheels, the driving mechanisms 4 connecting the driving plate 2 to the intermediate plate 5, the driving mechanism 4' connecting the intermediate plate 5 to the intermediate plate 6, the crown wheel 7, driving racks 8 for the intermediate plates 5 and 6, the driving pinion 9 with the change speed lever 10, planet wheels 11 and, finally, the teeth 12 formed at the end of the driven shaft 13.

The driving mechanism 4'' connect the intermediate plate 6 to an auxiliary plate 21 connected, in its turn, by means of driving mechanism 4''', to the crown wheel 7.

The plane surface 14 of plate 3, the cylindrical surface 15 of this same plate and the cylindrical surface 16 of crown wheel 7 delimit an annular groove in which enter the projections 17 which are carried, in this form of construction, by the auxiliary plate 21.

The free wheel mechanism arranged between the projections 17 can be similar to those described with reference to Figs. 2 and 3, this arrangement being however given by way of example only and not in a limiting sense.

The device illustrated in Fig. 4 is, moreover, completed by a casing 22, the face 23 of which can be fitted up at the end of the engine casing, the driven shaft 13 issuing through a cheek member 24 carrying the usual ball bearings.

The device illustrated in Fig. 4 allows the rotation of shaft 13 at the same speed as the driving shaft 1 and in the same direction, and it also allows of driving said shaft 13 at a progressively decreasing speed until it stops (the driving shaft 1 always rotating at normal working speed), of reversing the direction of rotation of shaft 13 and of increasing its speed of rotation, in the new direction under consideration, up to a certain value, these various movements being obtained, simply by the manipulation of the change speed lever 10.

This device allows moreover of starting the engine from shaft 13, without risk for the user and this owing to the presence of a free wheel device 26.

When the apparatus is interposed in the engine-propeller unit of an airplane for instance, it is possible, by setting lever 10 in the position corresponding to dead center, to start the engine by means of the air-screw without risk of driving the latter by said engine when it starts. Owing to the fact that it is moreover possible to obtain reverse running, the airplane can be braked or checked upon landing.

It is obvious that the device described above and illustrated in the accompanying drawings is given by way of indication only and not in a limiting sense, and that it can receive numerous modifications of detail without departing thereby from the scope of the invention.

What I claim is:

1. A speed gear of the type described comprising in combination a driving shaft, a driving plate and a planet carrier, both rigid with the said driving shaft, a driven shaft, a pinion formed at the end of the latter, a crown wheel concentric to the driven shaft, intermediate plates interposed between the driving plate and the crown wheel and actuating means interposed respectively between the driving plate and the first intermediate plate on one side, between the intermediate plates on the other side, the last intermediate plate and the crown wheel on the third side, a free wheel device interposed between the planet carrier, one of the intermediate plates and the crown wheel, whereby the latter cannot, at any moment, rotate more rapidly than the said intermediate plate.

2. In the speed gear as claimed in 1 the feature that the free wheel comprises a plurality of balls each of the said balls cooperating with a movable incline, the said balls and the inclines being driven by the corresponding intermediate plate.

GEORGES ROËS.